C. SMALLWOOD.
Guano-Sowers.

No. 146,288.          Patented Jan. 6, 1874.

Witnesses:
Chas. H. Isham
H. A. Daniels

Inventor:
Charles Smallwood.
per G. B. Towles att.

UNITED STATES PATENT OFFICE.

CHARLES SMALLWOOD, OF LEWISTON, NORTH CAROLINA.

IMPROVEMENT IN GUANO-SOWERS.

Specification forming part of Letters Patent No. 146,288, dated January 6, 1874; application filed October 25, 1873.

*To all whom it may concern:*

Be it known that I, CHARLES SMALLWOOD, of Lewiston, in the county of Bertie and State of North Carolina, have invented certain new and useful Improvements in Guano-Sowers; and I do hereby declare the following to be a full, clear, and exact description of the invention, such as will enable others skilled in the art to which it pertains to make and use it, reference being had to the accompanying drawings, which form part of this specification.

My invention relates to agricultural implements for sowing guano and other substances used for strengthening and enriching the soil; and consists in certain improvements and modifications in the construction of the same, as hereinafter shown and described. The object of my invention is to provide an implement for sowing or scattering guano and other similar substances with facility and in deposits to suit the necessities of the soil, very slight deposits being sometimes necessary.

Figure 1:
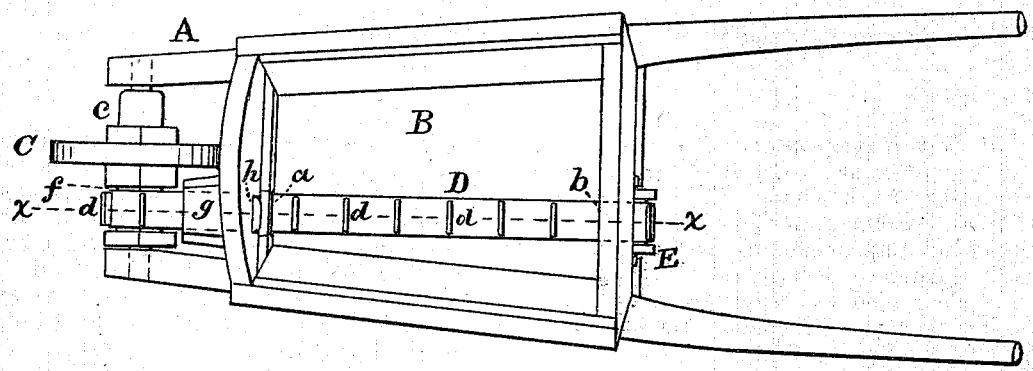
Figure 2:
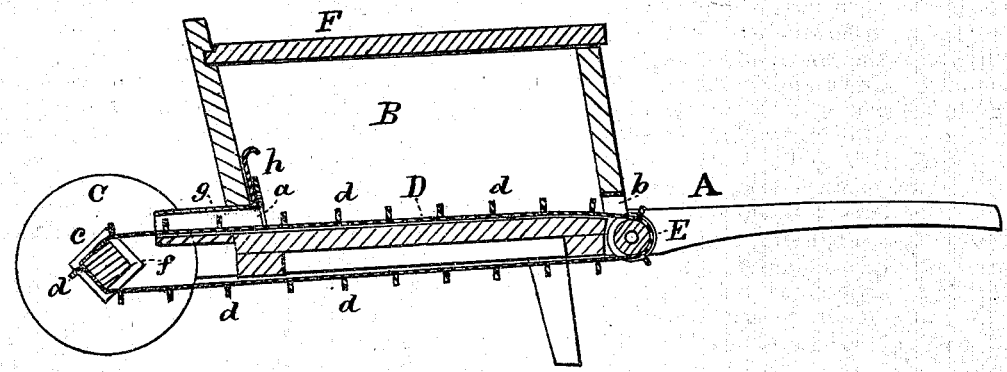

In the accompanying drawing, which illustrates my invention and forms a part of the specification thereof, Figure 1 is a plan view of my improved guano-sower. Fig. 2 is a vertical longitudinal section taken on the line $x\,x$ in Fig. 1.

In the drawing referred to, A designates a vehicle made in the form of the ordinary wheelbarrow, provided with the box or hopper B, with a removable cover, F, and having at the bottom the aperture $a$ in the front and the aperture $b$ in the rear side thereof. C designates the wheel, upon which the vehicle is moved, and which also serves as a driving-wheel, having the axle $c$, which is made to turn with the wheel. E indicates a pulley or roller placed in a recess in the rear of the frame or casing, so that the endless band D may pass over it through aperture $b$. The spout $g$ is suitably fixed outside the front to lead from the aperture $a$. $h$ indicates a sliding cover or valve, which is used to regulate the discharge through aperture $a$. The axle or shaft $c$ of the wheel C has a portion thereof made square, and sunk or grooved at $f$ to receive the band D, so that the axle, being made fast and revolving with the wheel, also actuates the said band. The endless band D is provided with the elevations or buckets $d$, and passes along the bottom of the hopper through aperture $a$ and spout $g$, over the axle, underneath the hopper, over roller E, and through aperture $b$, as clearly shown in the drawing.

The guano being put into the box or hopper, the machine is moved along the furrow like an ordinary wheelbarrow. The endless band, being put in motion by the revolution of the wheel, passes through the guano in the box, and conveys it, by means of the elevations $d$, in small quantities, through aperture $a$ and spout $g$, the guano falling into the furrow as it passes over the axle $c$.

The quantity of guano sown may be regulated by the valve $h$, and also by substituting a band with larger or smaller elevations, as may be desired.

The guano, being of a light, dry nature, is kept from being tilted out of the body of the barrow or blown out by the wind by the cover F, which is preferably arranged to slide in grooves in the sides of the body.

Having described my invention, I claim—

In a wheelbarrow having the body provided with a top or cover, the combination of the endless band D, provided with elevations or buckets, with the regulating valve or slide $h$ and spout $g$, all constructed and operating substantially as and for the purpose set forth.

In testimony that I claim the foregoing I have hereunto set my hand this 21st day of July, 1873.

CHAS. SMALLWOOD.

Witnesses:
JOSEPH COTTEN,
J. S. GRIFFIN.